UNITED STATES PATENT OFFICE 2,370,443

NONMETALLIC ELECTRIC RESISTANCE MATERIAL AND PROCESS FOR PRODUCING SAME

Karl Biefeld, Bad Freienwalde on the Oder, Germany; vested in the Alien Property Custodian No Drawing. Application February 5, 1941, Serial No. 377,578. In Germany December 28, 1936

3 Claims. (Cl. 201—76)

This invention relates to nonmetallic electric resistance material and to a process for producing same.

It is known to produce electric resistance materials from oxides and mixtures of oxides and also to use certain complex combinations, particularly ferrosoferric oxide, or magnetite, either by itself or with admixtures of resistance increasing substances like light metal compounds, ceramic masses, etc., as resistance material. It has further been proposed to employ for this purpose substances which can be derived in the form of salts from acids consisting chiefly of the higher stages of oxidation of metals, as copper chromate. Current conducting minerals like magnetite, red zinc ore, iron glance, iron pyrites, etc. have been used also. It has been found, however, that apart from the metallic carbides and, above all, silicon carbide, which do not constitute oxygen compounds and at higher temperatures succumb to the attack of atmospheric oxygen, these proposals have not yet brought about any practical success. Experiments may further be mentioned to combine metal powders mixed with ceramic masses, as clay, kaolin, etc., into resistance masses, but the materials produced cannot withstand any appreciable loading by the electric current.

It is the object of the invention to provide electric resistance materials consisting of synthetically prepared compounds of the spinel type formed by sintering oxides mixed at an accurate stoichiometric ratio, which at room temperature possess a degree of electric conductivity suitable for resistance purposes, or of a mixture of such compounds obtained by sintering them together and also distinguished by a suitable specific resistance.

Substances of the spinel type for producing stable, corrosion resisting ceramic resistance materials have been chosen chiefly for the reason that such spinels, besides their excellent thermal and frequently also electrical properties, possess the isomorphism due to the uniform character of the crystal lattice, which means that these substances may be mixed in all proportions to obtain perfectly homogeneous masses containing the original constituents mutually in solid solution. The result is that the mixtures of such substances of the spinel type are just as corrosion resisting as their components, i. e., that they do not vary their quality and structure if constantly subjected to the action of heat or, in other words, do not age.

Apart from the spinel itself, some of these substances occur in nature, though usually contaminated and with a few exceptions not in sufficient quantities. Contaminations, however, particularly those containing silicic acid, change the electric properties of these substances in a highly unfavorable manner and impair also corrosion resistance. For this reason, the invention makes use of synthetically prepared substances.

Substances of the spinel type are chemically perfectly well defined compounds of the formula

$R^{II}$ being a bivalent metal like Mg, Fe, Ti, Co, Cr, Zn, Cd and possibly also Cu, and $R^{III}$ being a trivalent metal like Al, Ce, Fe, Ti, Cr, Mn. Their fundamental type is spinel proper, i. e.

Substances possessing spinel character show valuable physical properties including particularly high constancy of temperature.

One of the commonest minerals of spinel type is magnetite, $Fe(Fe_2O_4)$, which in its synthetic form as ferrosoferric oxide has been proposed already as suited for resistance purposes and in its unmixed form is therefore disregarded by the present invention, because its conductivity in this condition is much too high for resistance. It has been attempted to impart a higher specific resistance to ferrosoferric oxide or magnetite by nonconducting admixtures, as oxides, clay, steatite, etc., but this has led to no practical results, because such mixtures, even if heated to melting temperature, fail to yield solid solutions like the above-mentioned spinel mixtures. The resistance materials thus produced either lack stability as to temperature, even if heated to the melting point, since the melting temperature, particularly in case of siliceous admixtures like steatite, is at once reduced thereby several hundred degrees, or they corrode at any appreciable electrical load owing to their inhomogeneous composition and lack also those electrical properties that are required for practically useful resistances. The temperature coefficient of the specific resistance is strongly negative, and the resistance itself continually varies at constant temperature during the passage of the current until it is completely destroyed. Closer examination discloses the fact that the resistance mass is not uniform due to the juxtaposition of substances of different crystalline structure, and the added oxides in particular are usually present therein in free and unmixed condition and form nonconducting inclusions which produce destructive transfer resistances and arcing. Additions of siliceous substances form bisilicates, i. e. glass or slag streams, which do not combine with the excess magnetite and produce similar effects as the oxide inclusions mentioned. In short, such mixtures lack the indispensable homogeneity. Similar experiments with a view to rendering magnetite suitable for resistance purposes have been made in larger numbers and are therefore not new. New, on the other hand, is the employment of mixtures of magnetite with other substances of the spinel type for resistance purposes, and herein resides the main feature of the invention.

When substances of the spinel type, briefly referred to below as "spinels," are examined as to their electrical properties, it will be found that only a few of the pure unmixed spinels yield useful resistance material, mostly because the specific resistance is not great enough, whereas by mixing such compounds in certain experimentally determined proportions resistance materials possessing excellent physical properties are obtained. The already mentioned isomorphism of the spinels insures such a high degree of homogeneity of the mixtures that the individual components thereof completely disappear and their physical properties undergo a change. This change takes place, however, in a certain order within a mixture series comprising equal components, though in different proportions, so that after corresponding preparation the physical properties, particularly the melting point, the fusing temperature, the specific electric resistance and the temperature coefficient thereof can be accurately determined by experiment for each mixing proportion. As these physical properties continually vary with the mixing proportion, it is possible after adopting a principle, as a formula, table or curve, accurately to determine the resistance conditions for each mixture series from the very start, or to find in each instance, if the dimensions of the resistance body required are known, the mixture possessing the desired absolute resistance at a predetermined operating temperature of the resistance material.

Synthetic spinels can be produced in the simplest manner from the oxides serving as initial material by sintering. However, as sintering by mere mixing of the oxides concerned and their subsequent heating is successful only in rare instances, various steps are required for chemically combining the elements. One of these steps consists in forming the finely crushed and well mixed constituents into briquettes. The stoichiometrically accurately weighed in constituents are intimately mixed and with the aid of a binding agent like dextrin, sulfit liquor, etc. which can be completely removed again by heating pressed into plain firm bodies, unless it is desired to impart to the pressed masses their final shape already at this step. Having been dried, the bodies are sintered at a temperature slightly below the melting point of the finished spinel and usually quite high, which in every instance has to be found out by experience. Sometimes, and particularly if easily dissociable (CuO) or subliming ingredients (CdO, ZnO) are contained in the mixture, sintering has to be carried out in stages, i. e., the temperature must be raised by steps. After the sintering process it is usual to crush the bodies again and to reshape them by pressing, drawing, etc.

An easier procedure comprises preparatory sintering by means of fluxes, since in this case the sintering temperature can be kept far below the sintering temperature proper. In this respect, there are four different kinds of fluxes: In the first place, those that can be dissolved out again by a solvent, mostly water, after sintering; secondly, those that can be evaporated again after sintering by a subsequent rise in temperature; thirdly, those whose admixture has no detrimental effect upon the physical properties of the elements, especially resistance and temperature coefficient, and which may therefore remain in the mixture; and fourthly, those whose harmful ingredients can be removed by subsequent heat treatment or during sintering.

To the first class of fluxes belong salts which have a correspondingly low melting point but do not decompose at the prevailing temperatures; they comprise, above all, alkali salts, as sodium chloride, potassium sulfate, etc. The sintering temperature lies slightly above the melting point of the salts and is always such as to cause only little decomposition or none at all. When sintering has been performed, the flux is dissolved out with the aid of water soluble salts, as water, during which process the mass disintegrates or at least softens and can be easily crushed. The spinels are thus obtained in finest crystalline condition. Further shaping to produce resistance bodies, which includes subsequent sintering, is performed in known manner as stated above.

The fluxes of the second class comprise easily fusible or easily vaporizable metallic oxides like PbO, $Bi_2O_3$ which frequently permit perfect sintering already at a temperature of somewhat above 1,000° C. Their retention in the resistance mass has, however, a detrimental effect upon their thermal and particularly their electric behavior, so that it is advisable to vaporize them out again by suitable heat treatment, in which case the temperature may remain far below the sintering temperature of the pure spinel mass.

The third class of fluxes mentioned are those that may either form a constituent of a compound of the spinel type or that do not act detrimentally even in isolated condition, since they are good conductors themselves. An example is cadmium oxide which is a good conductor per se and in sintered condition will stand temperatures far above 1,500° C. and which on the other hand, at a little over 1,200° C., forms cadmium ferrite with iron oxide, which is a compound of the spinel type.

Of the fluxes of the fourth class special mention should be made of metallic compounds having a relatively low melting point. As they would detrimentally influence the thermal or electrical properties if they were to remain as such in the mass, their harmful portion is volatilized by decomposition at corresponding temperatures. The remaining portion, an oxide, is either kept isolated in the mass or combines with another constituent of the mass to form a compound of the spinel type. Examples are the chlorides and nitrates of some heavy metals, which decompose at higher temperatures, the acid portion or the halogen escaping in gaseous form and the base remaining as oxide in the mixture and combining again in certain circumstances.

Finally, a simplified process for producing mixed spinels may be mentioned which is applicable when one substance of the spinel type is already present in finished condition and both constituents of the mixture are based on the same bivalent or trivalent oxide. In this instance, a double spinel can be prepared simply by adding another simple oxide. The following is an example:

A mixture of ferroferrite, Fe(Fe₂O₄), and ferrochromite, Fe(Cr₂O₄), is to be prepared. As finished ferroferrite can be easily procured from hammer or mill scale, it suffices to add a corresponding amount of chromium oxide, Cr₂O₃, to obtain the mixture mentioned by sintering, since in this case a portion of the trivalent iron oxide in the ferroferrite is automatically reduced and with the chromium oxide forms ferrochromite. An example of the reversed case is the following: Manganous manganite is present, and zinc manganite is to be added as second substance. It is then only necessary to add zinc oxide to the manganous manganite and to sinter the mixture, which involves automatic oxidation of a portion of the bivalent manganic oxide (manganous oxide) to a trivalent one, so that finally a mixture of two spinels, zinc manganite and manganous manganite, is obtained.

The further treatment of the resistance masses up to the production of the finished resistance bodies is assumed to be known. Unless the first sintering operation producing the desired chemical compounds is to be directly combined with final shaping of the resistance bodies, for instance by imparting to the crude oxide mixtures the final shape of the resistance bodies by pressing, which in case of numerous mixtures can be done without trouble, the fusible masses are either cast into suitable molds or after preparatory disintegration provided with an appropriate binding agent and shaped as required by means of impression dies or an extruding press, whereupon they are subjected again to sintering during which operation the binding agent is removed.

When fluxes are used which would leave oxides in the resistance material, steps may be taken to insure subsequent conversion of these oxides into spinels. If the nature of the substances present is such that this conversion does not occur by itself, a certain amount of a second oxide that does not act as flux may be added to make sure that the flux is converted into a substance having spinel character. These processes may be illustrated by a few examples.

Assumed that ferrous aluminate, equal to black spinel or mineralogical hercynite, is used as fundamental substance in a resistance mass and cadmium oxide as flux, which acquires this quality already at somewhat above 1,000° C. whilst hercynite alone would sinter only at approximately 1,600° C. If to this mixture the accurately weighed quantity of iron oxide, (Fe₂O₃), required to combine with the cadmium oxide present to form cadmium ferrite is added, the peculiar property of the cadmium oxide to act as flux is at first not affected thereby. It "dissolves" the ferrous aluminate, that is, it produces sintering thereof already at about 1,200° C. However, during a rise in temperature to 1,280° C. within three hours, a corresponding amount of cadmium ferrite, the second substance of spinel type, is slowly formed while the iron oxide combines with the cadmium oxide which loses as intended its capacity to act as flux. The new mixture formed has then a fusing temperature of over 1,500° C. and may serve as resistance material up to this point.

If the fundamental substance is a mixture of ferrous aluminate and ferroferrite and cadmium oxide serves again as flux, sintering occurs at approximately 1,200° C. When after sintering the temperature is raised again to 1,280° C., the cadmium oxide is capable of splitting a corresponding amount of the ferroferrite present into FeO and Fe₂O₃, a portion of the cadmium oxide forming with the Fe₂O₃ cadmium ferrite, and the other portion does likewise with the FeO while atmospheric oxygen is absorbed. The following equation is probably applicable to the process:

$$2Fe(Fe_2O_4) + 3CdO + O = 3Cd(Fe_2O_4)$$

It is important to have the flux lose its characteristic as such, since the resistance will then be adapted for higher temperatures. The advantage afforded by the use of the flux is evident. Referring again to the example stated: Preparatory sintering with a water soluble flux brings about at first the chemical combination of the starting materials to form spinels at a temperature of only 1,000° C., and after shaping sintering can be completed with cadmium oxide at 1,200° C. In this way resistance bodies can be obtained which will withstand temperatures up to nearly 1,600° C.

What is claimed is:

1. A non-metallic electric resistance material consisting of a sintered mass of spinels comprising cadmium ferrite.

2. A non-metallic electric resistance material consisting of a sintered mass of spinels consisting of cadmium ferrite and aluminum oxide.

3. The method of preparing non-metallic electrical resistance which comprises mixing powdered ferrous aluminate with cadmium oxide to a sintering temperature adding iron oxide and raising the temperature to form a spinel mass containing cadmium ferrite.

KARL BIEFELD.